(12) United States Patent
Morita et al.

(10) Patent No.: US 10,754,695 B2
(45) Date of Patent: Aug. 25, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Masao Morita, Kanagawa (JP); Tadao Michimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 110 days.

(21) Appl. No.: 15/798,931

(22) Filed: Oct. 31, 2017

(65) Prior Publication Data

US 2018/0210759 A1 Jul. 26, 2018

(30) Foreign Application Priority Data

Jan. 26, 2017 (JP) ................. 2017-012402

(51) Int. Cl.
*G06F 9/50* (2006.01)
(52) U.S. Cl.
CPC ............ *G06F 9/5044* (2013.01); *G06F 9/505* (2013.01); *G06F 2209/5012* (2013.01)
(58) Field of Classification Search
None
See application file for complete search history.

(56) References Cited

U.S. PATENT DOCUMENTS

| | | | | |
|---|---|---|---|---|
| 8,782,189 B2* | 7/2014 | Akiyama | ............... | H04L 12/14 709/223 |
| 9,176,710 B2* | 11/2015 | Motoki | ................ | G06F 8/00 |
| 9,471,349 B1* | 10/2016 | Stone | ................ | G06F 9/5077 |
| 9,928,108 B1* | 3/2018 | Wagner | ............... | G06F 9/45533 |
| 10,002,026 B1* | 6/2018 | Wagner | ................ | G06F 9/5055 |
| 10,193,821 B1* | 1/2019 | Greenwood | .......... | H04L 47/783 |
| 2008/0201711 A1* | 8/2008 | Amir Husain | .......... | G06F 9/445 718/1 |
| 2011/0276695 A1* | 11/2011 | Maldaner | ............. | G06F 9/5083 709/226 |
| 2015/0261630 A1* | 9/2015 | Endo | ................... | G06F 11/2025 714/4.11 |
| 2015/0350442 A1* | 12/2015 | O'Connor | ........... | H04M 3/5232 379/265.11 |

(Continued)

FOREIGN PATENT DOCUMENTS

| | | |
|---|---|---|
| JP | 2011-118451 A | 6/2011 |
| JP | 2013-089033 A | 5/2013 |

*Primary Examiner* — Isaac T Tecklu
(74) *Attorney, Agent, or Firm* — Oliff PLC (57) ABSTRACT

An information processing apparatus includes a receiving unit that receives a process request for processing data, and a controller that, in response to receipt of a process request by the receiving unit, assigns a process to one of a first processing group including a processing unit that processes data, and a second processing group in which one or more processing units can be placed, the processing unit included in the first processing group including a number of processing units less than a predetermined upper limit number. The controller preferentially activates and assigns a process to the processing units included in the first processing group, and if the controller receives a process request that the processing units included in the first processing group are unable to fully process, the controller places a processing unit in the second processing group and assigns a process to the processing unit.

13 Claims, 7 Drawing Sheets

(56) References Cited

U.S. PATENT DOCUMENTS

| | | | |
|---|---|---|---|
| 2016/0191407 A1* | 6/2016 | Dvorkin | G06F 9/00 709/226 |
| 2016/0205179 A1* | 7/2016 | Cui | G06F 9/5083 709/226 |
| 2016/0308734 A1* | 10/2016 | Feller | H04L 41/5009 |
| 2017/0214632 A1* | 7/2017 | Ravi | G06F 16/24578 |
| 2019/0068506 A1* | 2/2019 | Zhang | H04L 47/125 |

\* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-012402 filed Jan. 26, 2017.

BACKGROUND

Technical Field

The present invention relates to an information processing apparatus, and a non-transitory computer readable medium.

SUMMARY

According to an exemplary embodiment of the present invention, there is provided an information processing apparatus including a receiving unit that receives a process request for processing data, and a controller that, in response to receipt of a process request by the receiving unit, assigns a process to one of a first processing group including a processing unit that processes data, and a second processing group in which one or more processing units can be placed, the processing unit included in the first processing group including a number of processing units less than a predetermined upper limit number. The controller preferentially activates and assigns a process to the processing units included in the first processing group, and if the controller receives a process request that the processing units included in the first processing group are unable to fully process, the controller places a processing unit in the second processing group and assigns a process to the processing unit.

BRIEF DESCRIPTION OF THE DRAWINGS

Exemplary embodiment of the present invention will be described in detail based on the following figures, wherein.

DETAILED DESCRIPTION

Figure 1:
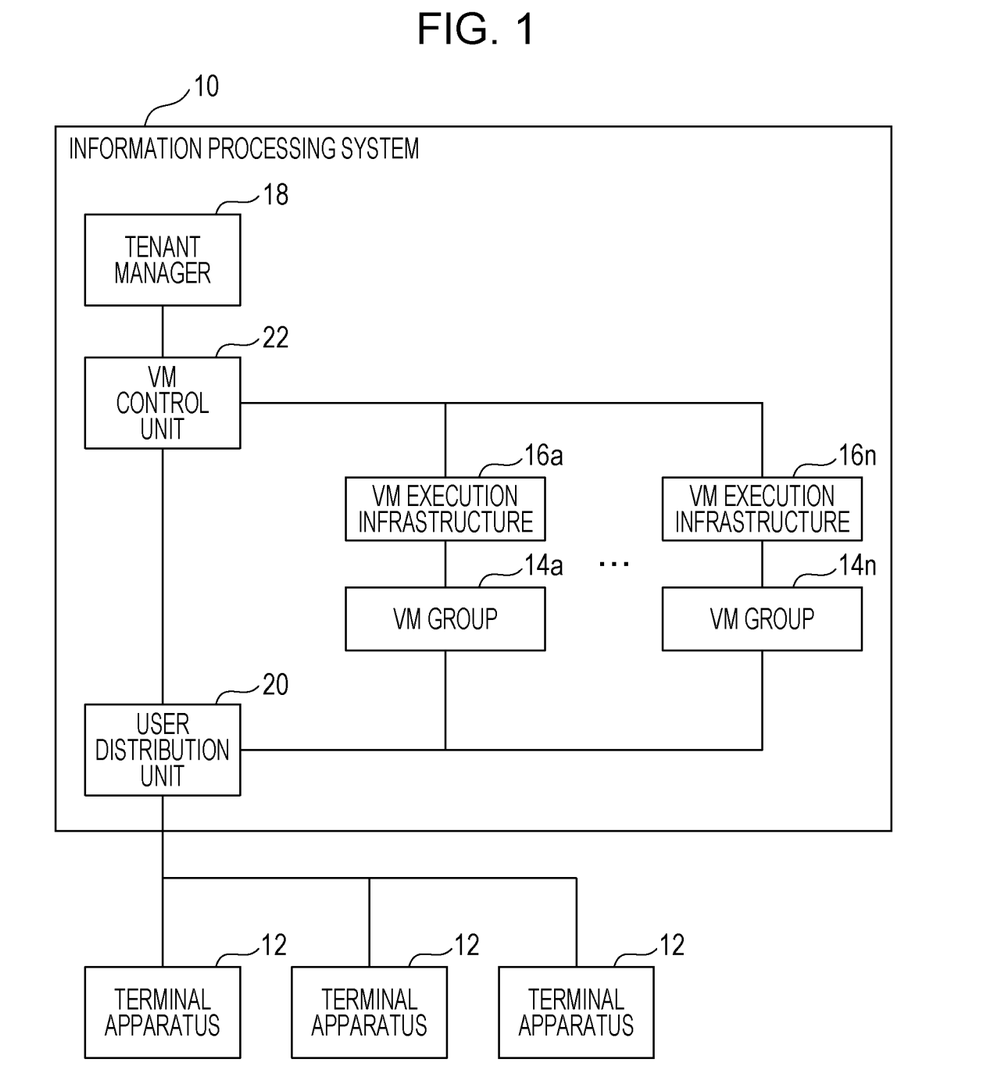
FIG. 1 illustrates an exemplary information processing system according to an exemplary embodiment.

With reference to FIG. 1, an information processing system according to an exemplary embodiment of the present invention will be described. FIG. 1 illustrates an exemplary information processing system according to the exemplary embodiment.

An information processing system 10 according to the exemplary embodiment provides a user with the service of executing processes. In one example, the information processing system 10 employs a multi-tenant system in which multiple users (tenants) share resources. Examples of the above-mentioned processes include a process related to printing (e.g., a print job). A print job (to be referred to as "job" hereinafter) represents data processing (e.g., image processing) performed to print, on a printer, user-specified document data to be printed. For example, the information processing system 10 receives document data from a terminal apparatus 12, such as a personal computer (PC) or a mobile terminal, via a communication path such as a network (not illustrated), converts the document data into print data in a format that can be handled by a printer (not illustrated), and supplies the resulting print data to the printer via the communication path to have printing executed by the printer. Of course, the information processing system 10 may execute processes other than a print job.

The information processing system 10 includes one or more virtual machines (VMs). A VM executes a process (e.g., a job) corresponding to an instruction given from the user. A VM may be built on an infrastructure provided by, for example, an Infrastructure as a Service (IaaS) provider.

Examples of job processes executed by a VM include converting document data into print data, transmitting converted print data to a printer specified by the user, converting document data into an image and then extracting information from the image, and transferring processing results to another server or other destinations.

A VM executes, in addition to processing of a job assigned to the VM, a user interface process that processes a request made from the user. Examples of user interface processes include a login process that involves determining whether to permit the user to connect (log in) to the information processing system 10, a process that involves receiving settings on parameters (e.g., print attributes such as the number of copies to be printed) for a job, a process that involves receiving a request for starting execution of a job, and a process that involves, upon receipt of a request for checking the state of a print job, providing the user with information about the state of the job.

The information processing system 10 includes, for example, one or more VM groups, and one or more VM execution infrastructures for managing each VM group. In the example illustrated in FIG. 1, the information processing system 10 includes VM groups 14a to 14n, and VM execution infrastructures 16a to 16n. Each VM group includes one or more VMs. Each VM execution infrastructure manages the maximum number of VMs included in the corresponding VM group, and collects information indicating the state (such as active or stopped) of each VM and retains these pieces of information (VM information). For example, the VM execution infrastructure 16a manages the maximum number of VMs included in the corresponding VM group 14a, and collects information indicating the state (such as active or stopped) of each VM included in the VM group 14a and retains these pieces of information. The same applies to other VM execution infrastructures. Each of the VM execution infrastructures 16a to 16n may be one built on a virtual machine.

A tenant manager 18 has the function of managing information about users (tenants) who use services provided by the information processing system 10. Tenant information includes, for example, information indicating the name of each tenant (name of each user), and information indicating the degree of multiplicity for each tenant (each user). The degree of multiplicity refers to the number of concurrently executable processes, that is, the number of processes that can be executed in parallel. The number of concurrently executable processes is set in advance for each individual tenant (each individual user) based on a service contract or other agreements, for example. For example, suppose that Tenant A (User A) has entered into a service contract for services provided by the information processing system 10, and the service contract specifies that the degree of multiplicity (the number of concurrently executable processes) for Tenant A is "3". In this case, Tenant A is able to request for three processes to be executed in parallel. For example, if, with two jobs requested from Tenant A being currently executed by a VM, a request for executing another job (third job) is made from Tenant A, the other job (the third job) is also executed by the VM. If, with three jobs requested from Tenant A being currently executed, a request for executing another job (fourth job) is made from Tenant A, the other job (the fourth job) is not executed but put into, for example, a waiting state. In this case, the fourth job is executed once the execution of at least one of the three currently executed jobs is completed.

A user distribution unit 20 has the function of distributing (assigning) a process request from a user (terminal apparatus 12) to one of VMs. The user distribution unit 20 references the degree of multiplicity for each user, and distributes a process request from a user to one of VMs.

Examples of process requests that a VM receives from a user (terminal apparatus 12) include a login request, a job execution request, and a job state check request.

Upon receipt of a login request from the terminal apparatus 12, the VM to which the login request has been assigned by the user distribution unit 20 determines, by use of user authentication information such as a password received from the terminal apparatus 12, whether to permit the user to log in. Once login is permitted, the user becomes logged in to the information processing system 10. A request from a logged-in user is received and processed by the VM that has accepted the user's login. That is, the user may be now regarded as logged in to the VM.

In the logged-in state, for example, information such as print data or print parameters is entered into the VM by the user (terminal apparatus 12). Then, the VM issues a unique job identifier, and stores the entered information into a shared storage for the user (tenant) in association with the job identifier. A shared storage is built by a VM for each user (each tenant), for example. When a job execution request is input to a VM from the terminal apparatus 12, the VM adds the job identifier to the end of a queue (print queue). Once each VM becomes ready to accept the next job, the VM accepts the job at the head of the queue.

When a user wants to check the state of a job inserted into a queue, the user requests for a job state check. In response to this request, a job state check request is sent from the terminal apparatus 12 to the information processing system 10. When a VM within the information processing system 10 receives this request, the VM returns, to the terminal apparatus 12, information indicating the current state of the job for which the request has been made.

When a user explicitly requests for a logout, or when a login times out due to user inactivity for a predetermined period of time, the user's logged-in state is cancelled. If the user wants to submit a request to the information processing system 10 after the login is cancelled, the user needs to log in again. For example, consider a case where the user logs in and submits a job, makes a job execution request, and then the login is cancelled. If, thereafter, the user wants to know the state of the job, the user makes a login request and logs in to the information processing system 10 again, and then makes a job state check request.

A VM control unit 22 has the function of controlling each VM. The VM control unit 22 has the function of activating a VM that is in a stopped state or stopping a VM that is in an active (i.e., running) state, for example.

The tenant manager 18, the user distribution unit 20, and the VM control unit 22 may be also built on a virtual machine.

As VM information managed by the VM execution infrastructure 16*a* or other components, for example, the following pieces of information are registered for each VM: a VM identifier that uniquely identifies the VM, the state of the VM, the number of users that can be simultaneously accepted by the VM, the number of users currently logged in to the VM (logged-in user count), a list of the user identifiers of currently logged-in users (logged-in users), the maximum number of jobs that can be executed in parallel by the VM, and a list of the job identifiers of jobs currently executed by the VM (currently executed jobs).

The maximum number of jobs and the maximum number of users are determined in advance in accordance with the throughput of each VM. Examples of VM states may include an idle state in addition to states such as active and stopped states. The active state refers to when a VM has already been activated, that is, the VM is ready to execute a job or user interface process. The stopped state refers to when a VM is currently stopped. For a stopped VM to become able to execute a user interface process (such as receiving a request from the user), an activation process for activating the VM is required, and this activation process takes some time. The idle state refers to an intermediate state between the active state and the stopped state, that is, a preparatory stage prior to stopping. Although a VM has not been stopped yet in the idle state, the VM in this state neither accepts a new job nor executes a user interface process. For the VM to execute such a process, the VM needs to return to the active state. It is to be noted, however, that since an idle VM has not been stopped yet, an activation process is not required to return the VM into the active state so that the VM becomes able to execute a new job or user interface process. Thus, the time required for the activation process is reduced or eliminated.

VM information is updated by the user distribution unit 20, the VM control unit 22, and each VM as needed. For example, when the VM control unit 22 causes a VM to transition to another state, the state of the VM within the VM information is updated to a value that reflects the transition. When the user distribution unit 20 distributes a login request from a user to one of VMs, 1 is added to the logged-in user count for the VM within the VM information. When a VM executes a login process and authenticates a user, the user identifier of the user is added to the VM information as an indication of the logged-in user. When a user currently logged in to a VM logs out, 1 is subtracted from the logged-in user count for the VM, and the user identifier of the user is removed from the VM information. When a VM takes a new job from a queue and starts executing the job, the job identifier of the job is added to a currently executed job field. When the VM completes the execution of the job, the job identifier of the job is removed from the currently executed job field.

Figure 2:
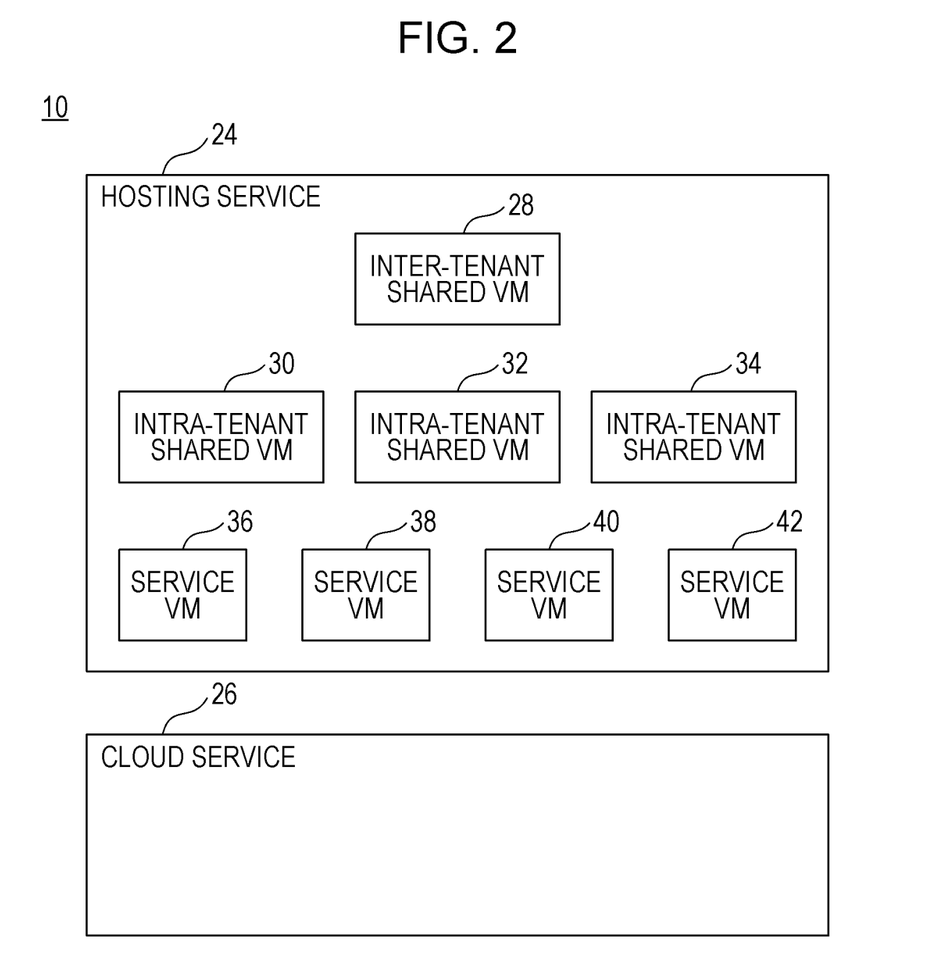
FIG. 2 illustrates an exemplary information processing system in an initial state.

Referring to FIG. 2, a detailed description will be given below of the information processing system 10 in an initial state. FIG. 2 illustrates the configuration of the information processing system 10 in an initial state. In the initial state, no process request is given by a user (tenant), and no user or no process is assigned to a VM.

In one example, the information processing system 10 includes a hosting service 24 that serves as a first processing group, and a cloud service 26 that serves as a second processing group.

The hosting service 24 includes multiple kinds of VMs. Examples of kinds of VMs include shared VMs such as an inter-tenant shared VM 28 shared among individual tenants (individual users) and an intra-tenant shared VM 30 shared within each tenant, and service VMs such as a service VM 36, which are processing units that each execute a job, a user interface process, or other processes.

For example, the inter-tenant shared VM 28 functions as each of the tenant manager 18, the user distribution unit 20, and the VM control unit 22.

An intra-tenant shared VM is provided in advance for each tenant (each user) and placed in the hosting service 24. That is, the hosting service 24 includes a number of intra-tenant shared VMs equal to the number of tenants (the number of users). For example, suppose that Users A, B, and C (Tenants A, B, and C) each enter into a service contract (e.g., a contact between the user and the administrator) for services provided by the information processing system 10, and use the services. Since the number of tenants (the number of users) is "3", three intra-tenant shared VMs (intra-tenant shared VMs 30, 32, and 34) are placed within the hosting service 24. For example, Tenant A (User A) is assigned in advance to the intra-tenant shared VM 30, Tenant B (User B) is assigned in advance to the intra-tenant shared VM 32, and Tenant C (User C) is assigned in advance to the intra-tenant shared VM 34. Each intra-tenant shared VM is used as, for example, a storage for a tenant assigned to the intra-tenant shared VM, and stores information such as a job requested by the user. For example, the intra-tenant shared VM 30 stores information such as a job requested by User A.

In their initial state, the inter-tenant shared VM 28 and the intra-tenant shared VMs 30, 32, and 34 have been activated in advance.

The hosting service 24 includes a number of service VMs less than a predetermined upper limit number (maximum number). The upper limit number equals to, for example, the sum total of the numbers of processes (the degrees of multiplicity) that can be executed concurrently (can be executed in parallel) by each individual tenant. As described above, the number of concurrently executable processes is set in advance for each tenant (each user) based on, for example, a service contract. For example, suppose that Users A, B, and C (Tenants A, B, and C) each enter into a service contract for services provided by the information processing system 10, and use the services. In this case, the number of concurrently executable processes on each tenant is set for each user based on the service contract. For example, suppose that the degree of multiplicity (the number of concurrently executable processes) for Tenant A (User A) is set to "3", the degree of multiplicity for Tenant B (User B) is set to "2", and the degree of multiplicity for Tenant C (User C) is set to "4". In this case, the upper limit number (the sum total of the respective numbers of processes that can be executed concurrently by Tenants A, B, and C) is "9". Thus, a number of service VMs less than "9" are placed in the hosting service 24. In the example illustrated in FIG. 1, four service VMs (service VMs 36, 38, 40, and 42) are placed in the hosting service 24. In the initial state, each service VM is not assigned to the corresponding tenant (corresponding user).

The cloud service 26 is a group in which one or more service VMs can be placed as processing units. In the initial state, no service VM is placed in the cloud service 26. The cloud service 26 is a group in which at least a number of service VMs large enough to be able to execute the above-mentioned upper limit number of processes together with service VMs included in the hosting service 24 can be placed. Specifically, the number of service VMs that can be placed in the cloud service 26 is equal to or greater than a number corresponding to the difference between the above-mentioned upper limit number and the number of service VMs included in the hosting service 24. For example, if the upper limit number is 9, and four service VMs are placed in the hosting service 24 in advance, then the cloud service 26 may be a group in which five or more service VMs can be placed.

When the user distribution unit 20 receives a process request (e.g., a job or user interface process) from a user (terminal apparatus 12), the user distribution unit 20 preferentially activates service VMs included in the hosting service 24 and assigns a process to each of the service VMs. If the user distribution unit 20 receives a process request that the service VMs included in the hosting service 24 are unable to fully process, the user distribution unit 20 places a service VM in the cloud service 26 and assigns a process to the service VM. In one example, if the user distribution unit 20 receives a number of process requests exceeding the total number of service VMs included in the hosting service 24, the user distribution unit 20 places a service VM in the cloud service 26 and assigns a process to the service VM. In another example, if the user distribution unit 20 receives a process request exceeding the load that can be handled by all the service VMs (the service VMs 36, 38, 40, and 42) included in the hosting service 24, the user distribution unit 20 may place a service VM in the cloud service 26 and assign a process to the service VM.

Figure 3:
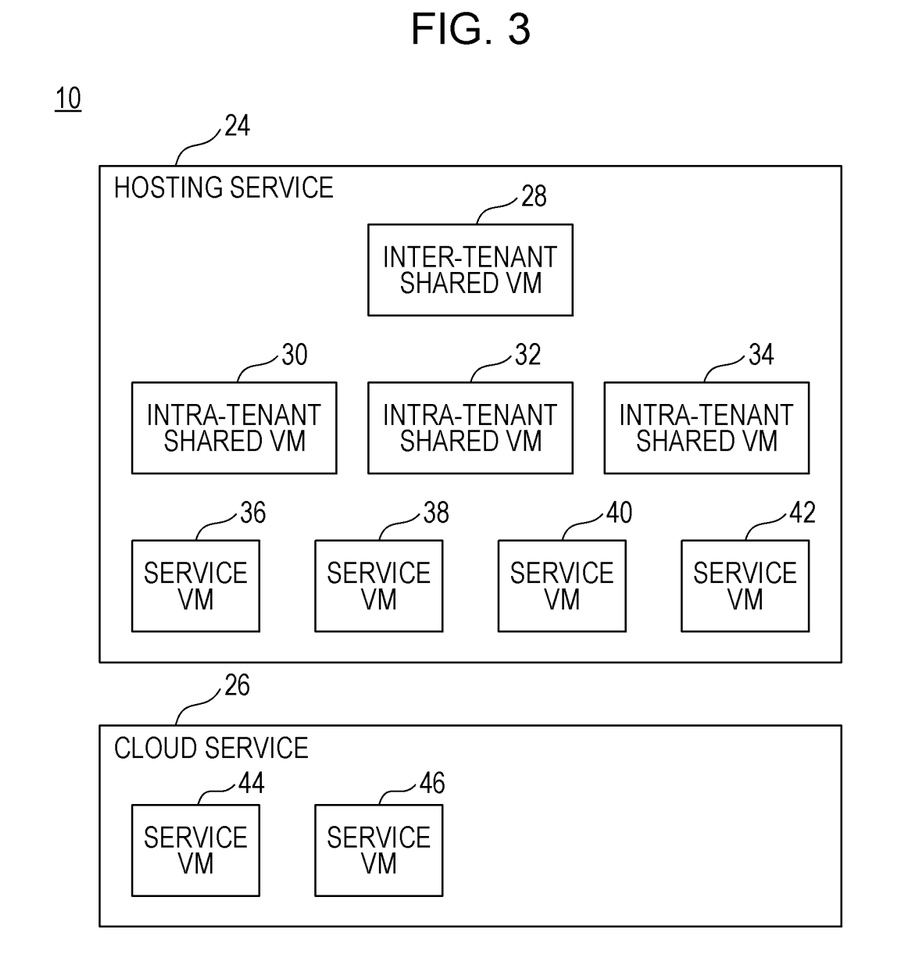
FIG. 3 illustrates an exemplary information processing system in an activated state.

Referring to FIG. 3, a detailed description will be given of how to control scale-in and scale-out of service VMs. FIG. 3 illustrates the configuration of the information processing system 10 in an activated state.

In response to an activate request for a service VM from each tenant (each user), the VM control unit 22 preferentially activates service VMs included in the hosting service 24 (scale-out). If the VM control unit 22 receives a number of activate requests exceeding the total number of service VMs included in the hosting service 24, then the user distribution unit 20 places a service VM in the cloud service 26 and activates the service VM (scale-out). Further, the user distribution unit 20 preferentially distributes a user to each of the service VMs included in the hosting service 24, and preferentially assigns a process (e.g., a job or user interface process) to each of the service VMs included in the hosting service 24. If the user distribution unit 20 receives a number of process requests exceeding the total number of service VMs included in the hosting service 24, the user distribution unit 20 assigns a process to a service VM included in the cloud service 26. The VM control unit 22 stops a service VM from which the user has logged out, or a service VM that has completed the execution of an assigned process (scale-in).

Hereinafter, a specific example of scale-out will be described. For example, suppose that activate requests A1, B1, C1, A2, B2, and C2 for service VMs are given in this order from individual tenants (individual users) to the information processing system 10. The activate requests A1 and A2 are activate requests given from Tenant A (User A), the activate requests B1 and B2 are activate requests given from Tenant B (User B), and the activate requests C1 and C2 are activate requests given from Tenant C (User C).

The VM control unit 22 activates a service VM (e.g., the service VM 36) within the hosting service 24 in response to the activate request A1 (scale-out), activates a service VM (e.g., the service VM 38) within the hosting service 24 in response to the activate request B1 (scale-out), activates a service VM (e.g., the service VM 40) within the hosting service 24 in response to the activate request C1 (scale-out), and activates a service VM (e.g., the service VM 42) within the hosting service 24 in response to the activate request A2 (scale-out). At this point, all the service VMs included in the hosting service 24 have already been activated. Thus, in response to the activate request B2, the VM control unit 22 newly places a service VM 44 in the cloud service 26 and activates the service VM 44 (scale-out), and in response to the activate request C2, the VM control unit 22 newly places a service VM 46 in the cloud service 26 and activates the service VM 46 (scale-out).

The user distribution unit 20 distributes User A (Tenant A) to the service VM 36 corresponding to the activate request A1 first, in preference to the service VM 42 corresponding to the activate request A2, and preferentially assigns a process (e.g., a job or user interface process) requested by User A to the service VM 36. Likewise, the user distribution unit 20 distributes User B (Tenant B) to the service VM 38 corresponding to the activate request B1 first, in preference to the service VM 44 corresponding to the activate request B2, and assigns a process (e.g., a job or user interface process) requested by User B to the service VM 38. Likewise, the user distribution unit 20 distributes User C (Tenant C) to the service VM 40 corresponding to the activate request C1 first, in preference to the service VM 46 corresponding to the activate request C2, and assigns a process (e.g., a job or user interface process) requested by User C to the service VM 40.

The VM control unit 22 stops a service VM from which the user has logged out, or a service VM that has completed the execution of an assigned process (scale-in). For example, when the service VM 44 completes the execution of a process (e.g., a job or user interface process) assigned to the service VM 44, the VM control unit 22 stops the service VM 44 (scale-in).

As described above, with the information processing system 10 according to the exemplary embodiment, if a number of process requests exceeding the number of service VMs included in the hosting service 24 are received, then a service VM included in the cloud service 26 is used. Therefore, in situations where service VMs placed in the hosting service 24 are unable to complete the execution of a process, the process is continued by using the cloud service 26.

The cloud service 26 is used when a process request that service VMs included in the hosting service 24 are unable to fully process is made, that is, on an as-needed basis. Accordingly, for cases where users are charged in accordance with the usage of the cloud service 26, the charge is limited and the cost of service usage is reduced in comparison to when only the cloud service 26 is used. Further, service VMs included in the hosting service 24 are preferentially scaled-out. This increases the likelihood that during scale-in, service VMs included in the cloud service 26 are first scaled-in. The cost of service usage is reduced also in this respect.

Another conceivable approach would be to place the above-mentioned upper limit number (the total number of concurrently executable processes) of service VMs in the hosting service 24, and use only the hosting service 24. For example, suppose that, as in the above-mentioned case, the degree of multiplicity for Tenant A is "3", the degree of multiplicity for Tenant B is "2", and the degree of multiplicity for Tenant C is "4". In this case, the number of required service VMs is "9". That is, the upper limit number is "9". In this case, nine service VMs are placed in the hosting service 24. Further, the inter-tenant shared VM 28 and the intra-tenant shared VMs for individual tenants (the intra-tenant shared VMs 30, 32, and 34) are placed in the hosting service 24. Accordingly, a total of 13 VMs are necessary. However, not all the service VMs (nine service VMs in the above case) necessarily execute processes in parallel. For example, as illustrated in FIG. 3, if six process requests are generated, only six service VMs out of the nine service VMs are to execute their assigned processes, and the remaining three services VMs are in a stopped state or are active but do not execute any process. This leads to lower utilization of service VMs included in the hosting service 24. According to the exemplary embodiment, a number of service VMs less than the upper limit number (the total number of concurrently executable processes) are placed in the hosting service 24, thus allowing for increased utilization of service VMs placed in the hosting service 24 in comparison to placing the upper limit number of service VMs in the hosting service 24.

Still another conceivable approach would involve predicting the number of process requests that will be generated in advance, placing, in advance, a number of service VMs required to handle the predicted number of process requests in the hosting service 24, and using only the hosting service 24. However, situations may arise where a number of process requests greater than predicted are generated. In such cases, processes corresponding to the number of those process requests exceeding the predicted number are not executed. According to the exemplary embodiment, processes corresponding to the number of those process requests exceeding the predicted number are executed by using the cloud service 26 to ensure that such a problem does not occur.

Hereinafter, modifications of the exemplary embodiment will be described.

Modification 1

If the user distribution unit 20 receives a process request exceeding the load that can be handled by all the service VMs (the service VMs 36, 38, 40, and 42) included in the hosting service 24, the user distribution unit 20 may place a service VM in the cloud service 26 and assign a process to the service VM. For example, suppose that each service VM is capable of executing multiple processes in parallel. In this case, in accordance with the load on each service VM (e.g., CPU utilization ratio) and the load of a requested process, the user distribution unit 20 assigns the requested process to a service VM that is executing another process, and if the user distribution unit 20 receives a process request exceeding the load that can be handled by all the service VMs (the service VMs 36, 38, 40, and 42) included in the hosting service 24, the user distribution unit 20 places service VMs (e.g., the service VMs 44 and 46) and assigns the corresponding process to the service VMs. For example, if the user distribution unit 20 newly receives a low-load process (e.g., a user interface process), which is a first process, the user distribution unit 20 assigns the newly received low-load process to a service VM that is already executing a low-load process. If the user distribution unit 20 newly receives a high-load process (e.g., a job process), which is a second process having a higher load than a low-load process, the user distribution unit 20 assigns the newly received high-load process to another service VM that is not executing any process. In this case, if the user distribution unit 20 receives a process request exceeding the load that can be handled by all the service VMs (the service VMs 36, 38, 40, and 42) included in the hosting service 24, the user distribution unit 20 places a service VM in the cloud service 26 and assigns a process to the service VM. In this case as well, as in the above embodiment, in situations where service VMs placed in the hosting service 24 are unable to complete the execution of a process, the process is continued by using the cloud service 26.

Modification 2

The hosting service 24 may include a number of service VMs equal to or greater than the number of tenants (the number of users) that use services provided by the information processing system 10. In the example mentioned above, Tenants A, B, and C (Users A, B, and C) are using such services, and thus the number of tenants is "3". In this case, three or more service VMs are placed in the hosting service 24. The hosting service 24 may include, for each individual tenant (each individual user), at least one dedicated service VM, with at least one service VM assigned to each tenant in advance. For example, suppose that the service VM 36 is a service VM dedicated to Tenant A, the service VM 38 is a service VM dedicated to Tenant B, and the service VM 40 is a service VM dedicated to Tenant C. In this case, Tenant A is assigned to the service VM 36 in advance, Tenant B is assigned to the service VM 38 in advance, and Tenant C is assigned to the service VM 40 in advance. The user distribution unit 20 assigns a process request from Tenant A to the service VM 36, assigns a process request from Tenant B to the service VM 38, and assigns a process request from Tenant C to the service VM 40. The presence of at least one service VM assigned to each tenant ensures that there is no tenant that is unassigned to a service VM included in the hosting service 24.

Modification 3

The information processing system 10 may include an emergency service VM. For example, if the hosting service 24 and the cloud service 26 do not include any available service VM to which a process request can be assigned, the user distribution unit 20 may assign the process to the emergency service VM. An available VM in this case refers to, for example, an active VM that is not executing another process. For example, if all service VMs are executing a process, then there is no available VM. An emergency service VM is a service VM that is not used during normal operations. For example, the emergency service VM may be, for example, a service VM provided within the hosting service 24 in advance, may be a service VM included in a VM group managed by a VM execution infrastructure that allows overcommit, or may be activated within a VM by using containerization. An emergency service VM may be, for example, a service VM dedicated to execute a specific process (e.g., a user interface process). In this case, if the user distribution unit 20 receives a request for a login process when there is no available VM, the user distribution unit 20 assigns the user interface process to the emergency service VM. This ensures that some response (e.g., a login success or failure) to the login process request is returned more quickly than when such an emergency service VM is not used. It is to be noted that if the user distribution unit 20 receives a request for processing a job, the user distribution unit 20 does not assign the job to the emergency service VM. In this case as well, the job is added to the end of a queue to be executed sequentially.

Figure 4:
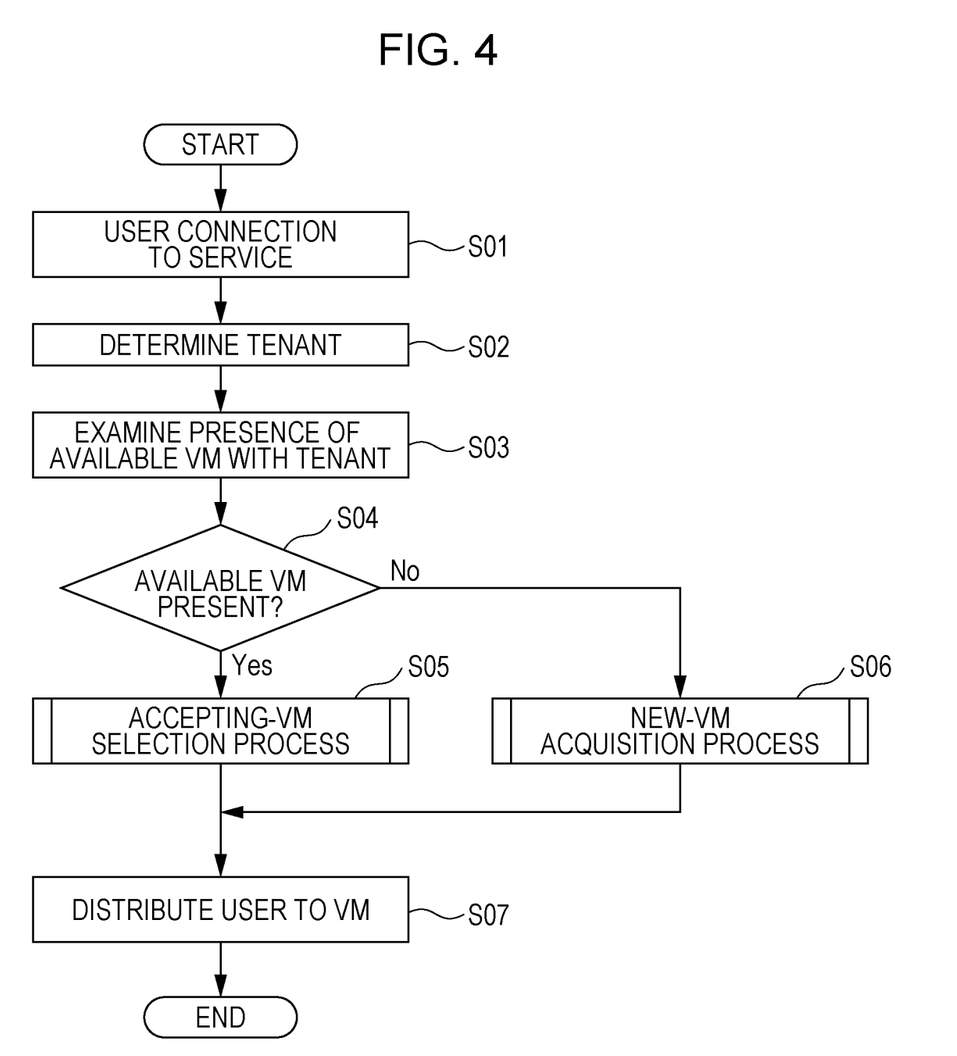
FIG. 4 is a flowchart illustrating an exemplary user distribution process.

Referring to FIG. 4, a user distribution process performed by the user distribution unit 20 will be described in detail below. FIG. 4 illustrates a flowchart related to the user distribution process.

First, a user connects to the information processing system 10 by means of the terminal apparatus 12 (S01), and the user distribution unit 20 determines the tenant of the user (S02). For example, if the user belongs to Tenant A, then the tenant of the user is Tenant A.

Next, the user distribution unit 20 examines whether there is any available service VM that is available to accept a process request within the tenant of the user (e.g., within Tenant A) (S03). That is, the user distribution unit 20 examines whether there is any service VM that has already been assigned to Tenant A and has already been activated but is not executing a process. If such a service VM exists (S04; Yes), the VM control unit 22 executes an accepting-VM selection process (S05). If such a service VM does not exist (S04; No), the VM control unit 22 executes a new-VM acquisition process (S06).

Once a service VM is acquired through step S05 or S06, the user distribution unit 20 distributes the user to the service VM (S07). For example, the user distribution unit 20 distributes a job or a user interface process to the service VM. At this time, the user distribution unit 20 references the degree of multiplicity for Tenant A, and if the number of requests from Tenant A exceeds the degree of multiplicity, the user distribution unit 20 does not distribute the user to the service VM.

Figure 5:
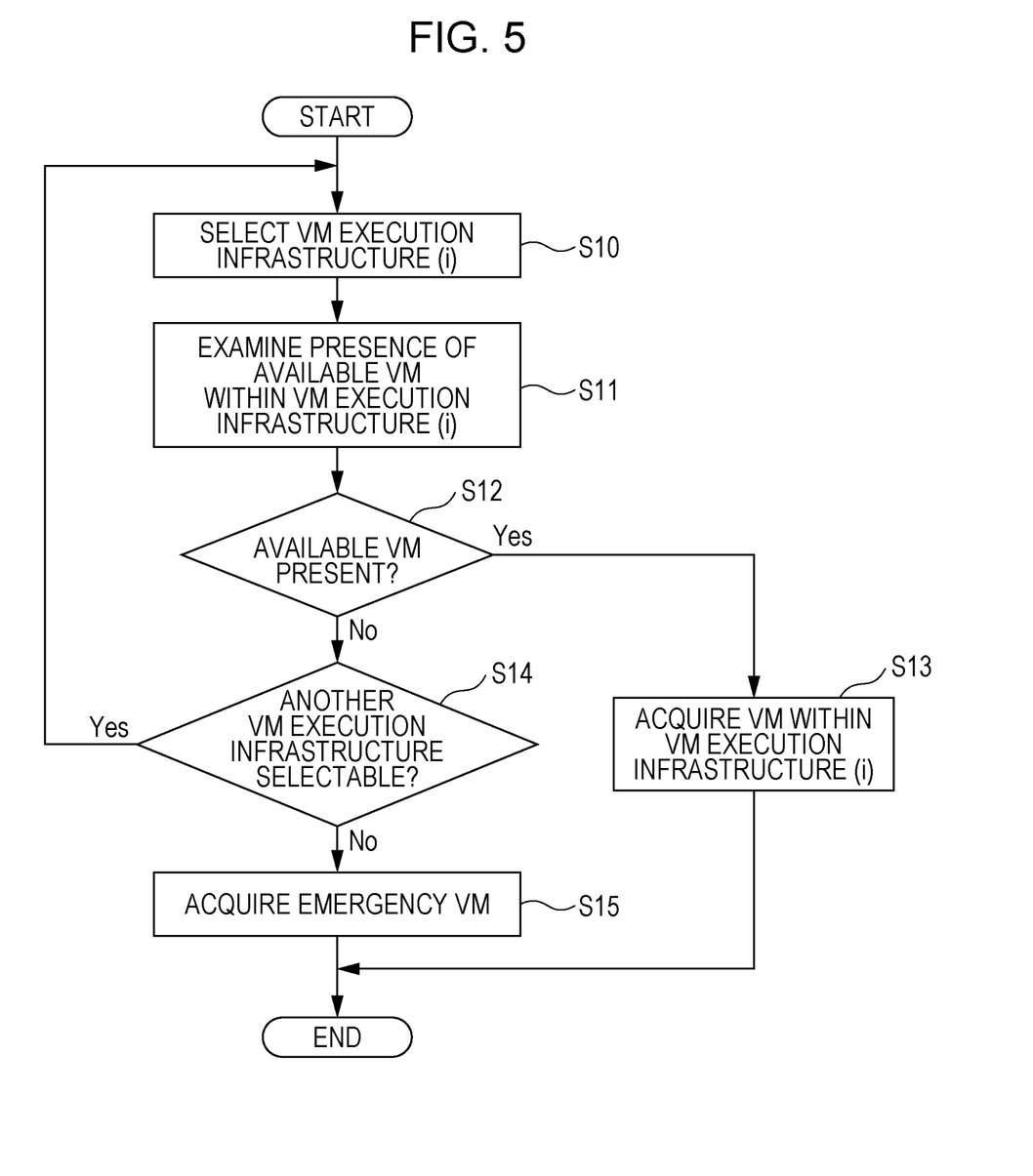
FIG. 5 is a flowchart illustrating an exemplary accepting-VM selection process.

Referring to FIG. 5, the accepting-VM selection process (S05 in FIG. 4) mentioned above will be described in detail below. FIG. 5 illustrates a flowchart related to the accepting-VM selection process.

The VM control unit 22 selects one VM execution infrastructure (i) from among the VM execution infrastructures 16a to 16n illustrated in FIG. 1 (S10). The VM control unit 22 may select each VM execution infrastructure in order of increasing infrastructure number, may select each VM execution infrastructure in order of decreasing processing speed, or may select each VM execution infrastructure in order of increasing per-unit usage price. In this case as well, the VM control unit 22 selects VMs included in the hosting service 24 in preference to VMs included in the cloud service 26.

Next, the VM control unit 22 checks whether there is any available service VM available to receive a process request within the VM group managed by the VM execution infrastructure (i) (S11). For example, a service VM that has been activated but is not executing a process corresponds to an available service VM, and a service VM that is executing another process due to an interrupt or other events corresponds to an unavailable service VM.

If there is any available service VM within the VM group managed by the VM execution infrastructure (i) (S12; Yes), the VM control unit 22 acquires the service VM (S13). In this case, the user distribution unit 20 distributes the user to the service VM (S07 in FIG. 4).

If there is no available service VM within the VM group managed by the VM execution infrastructure (i) (S12; No), and it is possible to select another VM execution infrastructure (S14; Yes), that is, if there is any VM execution infrastructure that has not been examined yet, the procedure transfers to step S10. In this case, the VM control unit 22 selects the next VM execution infrastructure (S10), and examines whether there is any available service VM within the VM group managed by the selected VM execution infrastructure (S11). If there is any available service VM (S12; Yes), the service VM is acquired.

If there is no available service VM within the VM group managed by the VM execution infrastructure (i) (S12; No), and it is not possible to select another VM execution infrastructure (S14; No), that is, if there is no VM execution infrastructure that has not been examined yet, the VM control unit 22 acquires an emergency service VM (S15). In this case, the user distribution unit 20 distributes the user to the emergency service VM (S07 in FIG. 4). At this time, a procedure may be employed in which the user distribution unit 20 checks information about a process being requested, and if the process is a login process, the user distribution unit 20 distributes the user to the emergency service VM and assigns the login process to the emergency service VM, and if the process is a job process, the user distribution unit 20 neither distributes the user to the emergency service VM nor assigns the job process to the emergency service VM.

Figure 6:
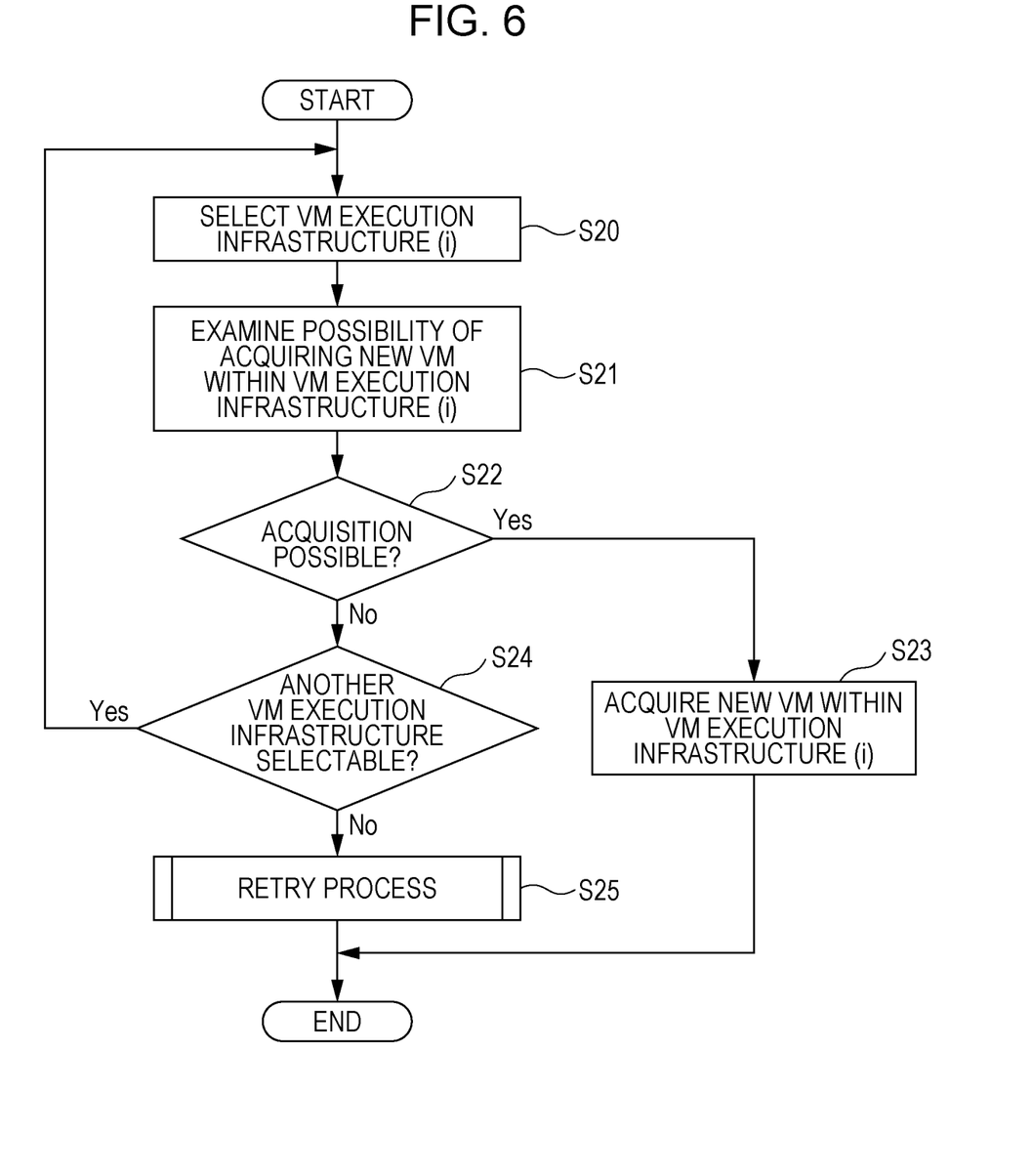
FIG. 6 is a flowchart illustrating an exemplary new-VM acquisition process.

Referring to FIG. 6, the new-VM acquisition process (S06 in FIG. 4) mentioned above will be described in detail below. FIG. 6 illustrates a flowchart related to the new-VM acquisition process.

The VM control unit 22 selects one VM execution infrastructure (i) from among the VM execution infrastructures 16a to 16n illustrated in FIG. 1 (S20). The VM control unit 22 may select each VM execution infrastructure in order of increasing infrastructure number, may select each VM execution infrastructure in order of decreasing processing speed, or may select each VM execution infrastructure in order of increasing per-unit usage price. In this case as well, the VM control unit 22 selects VMs included in the hosting service 24 in preference to VMs included in the cloud service 26.

Next, the VM control unit 22 examines whether it is possible to acquire a new service VM within the VM group managed by the VM execution infrastructure (i) (S21). For example, a service VM that is not executing any process corresponds to such a service VM that is newly acquirable, and a service VM that is executing another process due to an interrupt or other events corresponds to a service VM that is not newly acquirable.

If it is possible to acquire a new any service VM within the VM group managed by the VM execution infrastructure (i) (S22; Yes), the VM control unit 22 acquires the service VM (S23). In this case, the user distribution unit 20 distributes the user to the service VM (S07 in FIG. 4).

If it is not possible to acquire a new service VM within the VM group managed by the VM execution infrastructure (i) (S22; No), and it is possible to select another VM execution infrastructure (S24; Yes), that is, if there is any VM execution infrastructure that has not been examined yet, the procedure transfers to step S20. In this case, the VM control unit 22 selects the next VM execution infrastructure (S20), and examines whether it is possible to acquire a new any service VM within the VM group managed by the selected VM execution infrastructure (S21). If it is possible to acquire a new service VM (S22; Yes), the service VM is acquired.

If it is not possible to acquire a new service VM within the VM group managed by the VM execution infrastructure (i) (S22; No), and it is not possible to select another VM execution infrastructure (S24; No), that is, if there is no VM execution infrastructure that has not been examined yet, the VM control unit 22 executes a new-VM acquisition retry process (S25).

Figure 7:
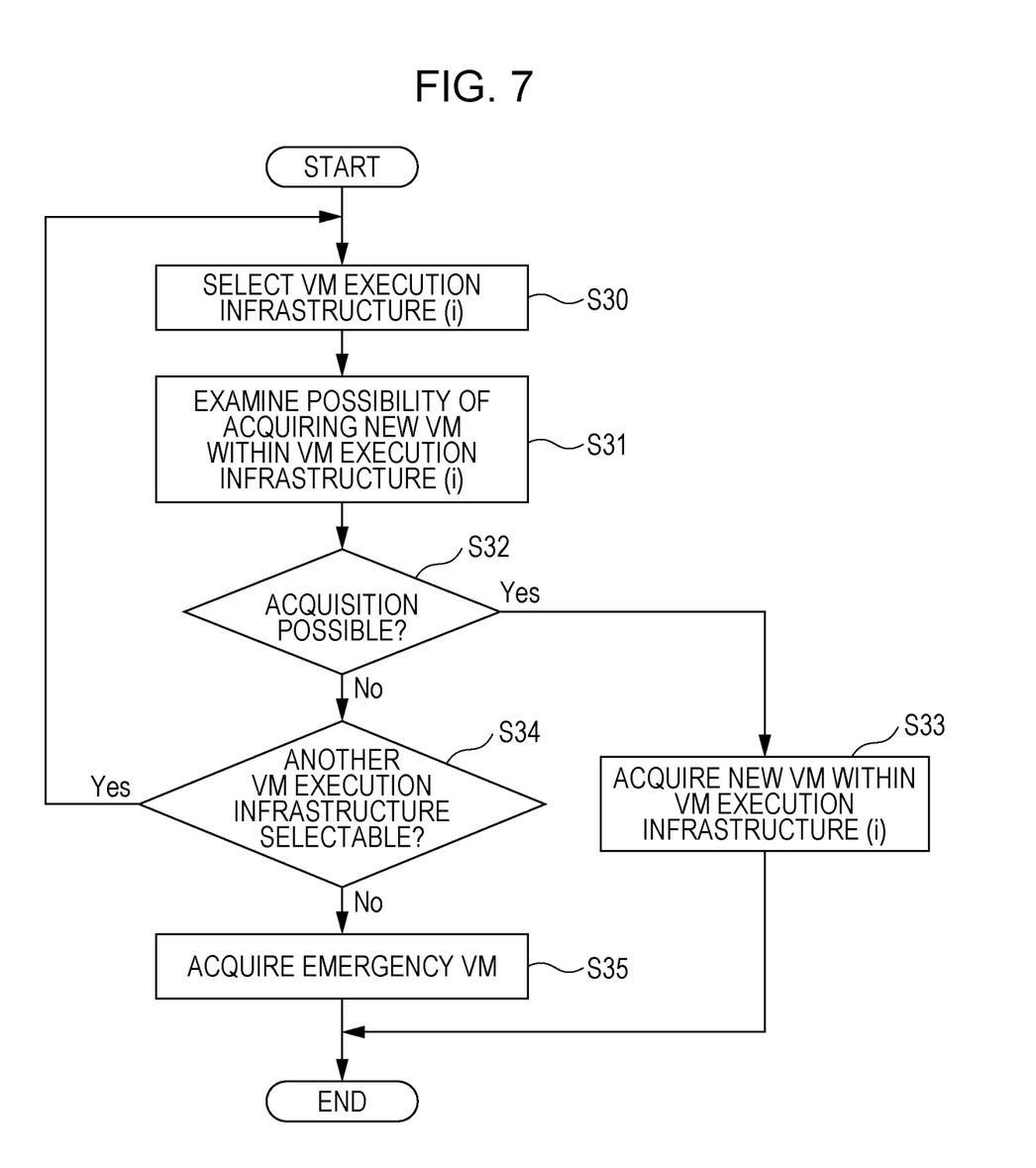
FIG. 7 is a flowchart illustrating an exemplary new-VM acquisition retry process.

Referring to FIG. 7, the new-VM acquisition retry process (S25 in FIG. 6) mentioned above will be described in detail below. FIG. 7 illustrates a flowchart related to the new-VM acquisition retry process.

The VM control unit 22 selects one VM execution infrastructure (i) from among the VM execution infrastructures 16a to 16n illustrated in FIG. 1 (S30). In the retry process, the VM control unit 22 may select one VM execution infrastructure from among a predetermined number of (e.g., five) VM execution infrastructures selected in order of increasing infrastructure number, from among a predetermined number of (e.g., five) VM execution infrastructures selected in order of decreasing processing speed, or from among VM execution infrastructures that allow overcommit. In this case as well, the VM control unit 22 selects VMs included in the hosting service 24 in preference to VMs included in the cloud service 26.

Next, the VM control unit 22 examines whether it is possible to acquire a new any service VM within the VM group managed by the VM execution infrastructure (i) (S31). For example, a service VM that is not executing any process corresponds to a service VM that is newly acquirable, and a service VM that is executing another process due to an interrupt or other events corresponds to a service VM that is not newly acquirable.

If it is possible to acquire a new any service VM within the VM group managed by the VM execution infrastructure (i) (S32; Yes), the VM control unit 22 acquires the service VM (S33). In this case, the user distribution unit 20 distributes the user to the service VM (S07 in FIG. 4). Even if the new-VM acquisition process illustrated in FIG. 6 fails to acquire a new service VM, in some cases, execution of a process is completed in a service VM during the retry process. In this case, the service VM is acquired as a new service VM.

If it is not possible to acquire a new service VM within the VM group managed by the VM execution infrastructure (i) (S32; No), and it is possible to select another VM execution infrastructure (S34; Yes), that is, if there is any VM execution infrastructure that has not been examined yet, the procedure transfers to step S30. In this case, the VM control unit 22 selects the next VM execution infrastructure (S30), and examines whether it is possible to acquire a new any service VM within the VM group managed by the selected VM execution infrastructure (S31). If it is possible to acquire a new service VM (S32; Yes), the service VM is acquired.

If it is not possible to acquire a new service VM within the VM group managed by the VM execution infrastructure (i) (S32; No), and it is not possible to select another VM execution infrastructure (S34; No), that is, if there is no VM execution infrastructure that has not been examined yet, the VM control unit 22 acquires an emergency service VM (S35). In this case, the user distribution unit 20 distributes the user to the emergency service VM (S07 in FIG. 4). At this time, a procedure may be employed in which the user distribution unit 20 checks information about a process being requested, and if the process is a login process, the user distribution unit 20 distributes the user to the emergency service VM and assigns the login process to the emergency service VM, and if the process is a job process, the user distribution unit 20 neither distributes the user to the emergency service VM nor assigns the job process to the emergency service VM.

Although the above exemplary embodiment and modifications are directed to a case where the information processing system 10 provides a print job execution service to a user, the information processing system 10 may execute another job, such as data processing on an image obtained by scanning or transfer of an image. In this case, the terminal apparatus 12 may be, for example, a scanner, a facsimile, or a multifunction machine (an apparatus that combines the functions of devices such as a printer, a scanner, a copier, and a facsimile).

In one example, the information processing system 10 mentioned above is implemented by cooperation of hardware and software. Specifically, the information processing system 10 includes one or more processors such as CPUs (not illustrated). As the one or more processors read and execute a program stored in a storage device (not illustrated), the functions of various component units of the information processing system 10 are implemented. The program is stored into the storage device via a recording medium such as a CD or DVD, or via a communication path such as a network. In another example, various component units of the information processing system 10 may be implemented by, for example, hardware resources such as processors, electronic circuits, or application specific integrated circuits (ASICs). A device such as a memory may be used for the implementation. In still another example, various component units of the information processing system 10 may be implemented by devices such as digital signal processors (DSPs) or field programmable gate arrays (FPGAs).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programmed to function as:
   a receiving unit that receives a process request for processing data, wherein the process request for processing data comprises a request for performing a process related to printing a document; and
   a controller that, in response to receipt of the process request by the receiving unit, assigns the process to one of a first processing group including a processing unit that processes data, and a second processing group in which one or more processing units can be placed, the processing unit included in the first processing group comprising a number of processing units less than a predetermined upper limit number, wherein the first processing group is located in the information processing apparatus, and the second processing group is located in another information processing apparatus different from the information processing apparatus, wherein
   the controller preferentially activates and assigns the process to the processing units included in the first processing group, and if the received process request is a process request that the processing units included in the first processing group are unable to fully process, the controller places a processing unit in the second processing group and assigns the process to the processing unit, and
   no processing units are placed in the second processing group initially, and the controller places the processing unit in the second processing group only in response to the controller receiving the process request that the processing units included in the first processing group are unable to fully process.

2. The information processing apparatus according to claim 1,
   wherein if the controller receives a number of process requests exceeding the number of processing units included in the first processing group, the controller places a processing unit in the second processing group and assigns a process to the processing unit.

3. The information processing apparatus according to claim 2,
   wherein the second processing group comprises a group in which a number of processing units equal to or greater than a difference between the upper limit number and the number of processing units included in the first processing group can be placed.

4. The information processing apparatus according to claim 1,
   wherein if the received process request exceeds a load that can be handled by all of the processing units included in the first processing group, the controller places a processing unit in the second processing group and assigns the process to the processing unit.

5. The information processing apparatus according to claim 4,
   wherein each of the processing units is capable of executing a plurality of processes in parallel, and
   wherein in accordance with a load on each of the processing units and a load of the requested process, the controller assigns the requested process to a processing unit that is executing another process, and if the received process request exceeds the load that can be handled by all of the processing units included in the first processing group, the controller places the processing unit in the second processing group and assigns the process to the processing unit.

6. The information processing apparatus according to claim 5,
   wherein if the controller newly receives a request for a predetermined first process, the controller assigns the newly received first process to a processing unit that is already executing the first process,
   wherein if the controller newly receives a request for a second process that has a greater load than the first process, the controller assigns the newly received second process to another processing unit that is not executing a process, and
   wherein if the controller receives a process request exceeding the load that can be handled by all of the processing units included in the first processing group, the controller places the processing unit in the second processing group and assigns the process to the processing unit.

7. The information processing apparatus according to claim 6,
   wherein the first process comprises a user login process, and
   wherein the second process comprises image processing.

8. The information processing apparatus according to claim 1, wherein the upper limit number is determined based on a sum total of numbers of processes that can be requested by individual users.

9. The information processing apparatus according to claim 1,
wherein the first processing group includes at least one dedicated processing unit for each individual user, and at least one dedicated processing unit is assigned to each user in advance.

10. The information processing apparatus according to claim 9,
wherein the first processing group comprises a number of processing units equal to or greater than a number of users.

11. The information processing apparatus according to claim 1,
wherein if no processing unit is available to be assigned to the first processing group and the second processing group, the controller assigns the process to an emergency processing unit.

12. The information processing apparatus according to claim 11,
wherein if the controller receives a request for a login process from a user when no processing unit is available to be assigned to the first processing group and the second processing group, the controller assigns the login process to the emergency processing unit.

13. A non-transitory computer readable medium storing a program causing a processor of an information processing apparatus, the processor being programmed to function as a receiving unit and as a controller, to execute a process for processing information, the process comprising:

receiving, by the processor programmed to function as the receiving unit, a process request for processing data, wherein the process request for processing data comprises a request for performing a process related to printing a document; and in response to the receiving of the process request, assigning, by the processor programmed to function as the controller, the process to one of a first processing group including a processing unit that processes data, and a second processing group in which one or more processing units can be placed, the processing unit included in the first processing group comprising a number of processing units less than a predetermined upper limit number, wherein the first processing group is located in the information processing apparatus, and the second processing group is located in another information processing apparatus different from the information processing apparatus, wherein the processing units included in the first processing group are preferentially activated and assigned to the process, and in response to the received process request being a process request that the processing units included in the first processing group are unable to fully process, a processing unit is placed in the second processing group and the process is assigned to the processing unit, and no processing units are placed in the second processing group initially, and the controller places the processing unit in the second processing group only in response to the controller receiving the process request that the processing units included in the first processing group are unable to fully process.

* * * * *